(12) United States Patent
Monden et al.

(10) Patent No.: US 11,296,375 B2
(45) Date of Patent: Apr. 5, 2022

(54) APPARATUS FOR POWER SUPPLY SYSTEM, CONTROL METHOD FOR POWER SUPPLY SYSTEM, AND POWER SUPPLY SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yukitaka Monden, Kanagawa (JP); Yoshie Takabayashi, Tokyo (JP); Tetsuharu Tanoue, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki-shi (JP)

( * ) Notice: Subject to any disclaimer, the term of this patent is extended or adjusted under 35 U.S.C. 154(b) by 49 days.

(21) Appl. No.: 16/992,464

(22) Filed: Aug. 13, 2020

(65) Prior Publication Data
US 2020/0373640 A1 Nov. 26, 2020

Related U.S. Application Data

(63) Continuation of application No. PCT/JP2018/005815, filed on Feb. 19, 2018.

(51) Int. Cl.
*H01M 16/00* (2006.01)
*H02J 7/34* (2006.01)

(52) U.S. Cl.
CPC .............. *H01M 16/003* (2013.01); *H02J 7/34* (2013.01); *H01M 2250/402* (2013.01); *H02J 2207/10* (2020.01); *H02J 2300/20* (2020.01)

(58) Field of Classification Search
CPC ......... H01M 16/003; H01M 2250/402; H01M 16/00; H02J 7/34; H02J 2207/10; H02J 2300/20
See application file for complete search history.

(56) References Cited

U.S. PATENT DOCUMENTS

| 6,902,837 B2 | 6/2005 | McCluskey |
| 2004/0053082 A1 | 3/2004 | McCluskey et al. |

(Continued)

FOREIGN PATENT DOCUMENTS

| JP | 2000-333386 A | 11/2000 |
| JP | 2004-129337 A | 4/2004 |

(Continued)

*Primary Examiner* — Robert L Deberadinis
(74) *Attorney, Agent, or Firm* — Foley & Lardner LLP

(57) ABSTRACT

A power supply system according to the present embodiment is a control apparatus for a power supply system that includes a hydrogen power generator adapted to generate hydrogen using electric power supplied from a power generator and supply a load with electric power generated using the generated hydrogen, and a storage battery configured to be quicker in control response than the hydrogen power generator and adapted to get charged and discharged to offset excess and deficiency of the electric power supplied to the load from the power generator, the control apparatus including: an acquiring unit adapted to acquire information about remaining energy in the storage battery; and a controller adapted to control the hydrogen power generator so as to start generating electric power when it is expected, based on the information, that the remaining energy in the storage battery reaches a first threshold within a predetermined time.

10 Claims, 8 Drawing Sheets

(56) References Cited

U.S. PATENT DOCUMENTS

2007/0042244 A1    2/2007   Spallone et al.
2014/0021785 A1    1/2014   Munier et al.

FOREIGN PATENT DOCUMENTS

| | | |
|---|---|---|
| JP | 2004-191150 A | 7/2004 |
| JP | 2005-539471 A | 12/2005 |
| JP | 2006-236741 A | 9/2006 |
| JP | 2013-074689 A | 4/2013 |
| JP | 2013-181852 A | 9/2013 |
| JP | 2015-136222 A | 7/2015 |
| JP | 2016-100934 A | 5/2016 |
| JP | 2017-103971 A | 6/2017 |
| WO | WO-2018/051417 A1 | 3/2018 |

|  | E1 | E2 | E3 | E4 |
|---|---|---|---|---|
| MODE I | 0 | 10KWh | 0 | 10KWh |
| MODE II | 0 | -2KWh | 12KWh | 10KWh |
| MODE III | 0 | 2KWh | 8KWh | 10KWh |
| MODE IV | 0 | 20KWh | 0 | 20KWh |
| MODE V | 30KWh | -10KWh | 0 | 20KWh |
| MODE VI | 0 | -2KWh | 22KWh | 20KWh |
| MODE VII | 0 | 5KWh | 15KWh | 20KWh |

APPARATUS FOR POWER SUPPLY SYSTEM, CONTROL METHOD FOR POWER SUPPLY SYSTEM, AND POWER SUPPLY SYSTEM

CROSS-REFERENCE TO RELATED APPLICATIONS

This application is a continuation application of International Application No. PCT/JP2018/005815, filed Feb. 19, 2018; the entire contents of which are incorporated herein by reference.

FIELD

An embodiment of the present invention relates to a control apparatus for a power supply system, a control method for a power supply system, and a power supply system.

BACKGROUND

A power supply system is known that supplies electric power to a load from a power generator that uses renewable energy such as wind power or sunlight. With this power supply system, when an amount of power supplied from the power generator to the load is insufficient, electric power is supplied to the load from a storage battery and hydrogen power generator used together with the power generator. In this case, electric power of the storage battery, which is higher in energy efficiency than the hydrogen power generator, is used preferentially. Therefore, if there is a shortage in power supply from the power generator to the load, electric power is supplied to the load from the storage battery when remaining energy in the storage battery is equal to or higher than a threshold, and the hydrogen power generator is started to supply electric power to the load from the hydrogen power generator when the remaining energy in the storage battery falls below the threshold.

When the hydrogen power generator is started, the power shortage is corrected, allowing surplus electricity to be used to charge the storage battery. However, if power consumption of the load remains high and the power generator produces low power output, it becomes necessary to supply electric power continuously to the load from the storage battery as well. If such a condition persists, stored energy of the storage battery will reach a discharge limit. Generally, in the power supply system, because short-term responses to the load are made by the storage battery, once the stored energy of the storage battery reaches the discharge limit, short-term responses cannot be given to the load, which causes the power supply system to stop. On the other hand, if the startup timing of the hydrogen power generator is advanced uniformly, the time until the storage battery reaches the discharge limit is extended, but the utilization rate of the hydrogen power generator increases, reducing the energy efficiency of the entire power supply system.

DETAILED DESCRIPTION

Figures 1, 2:
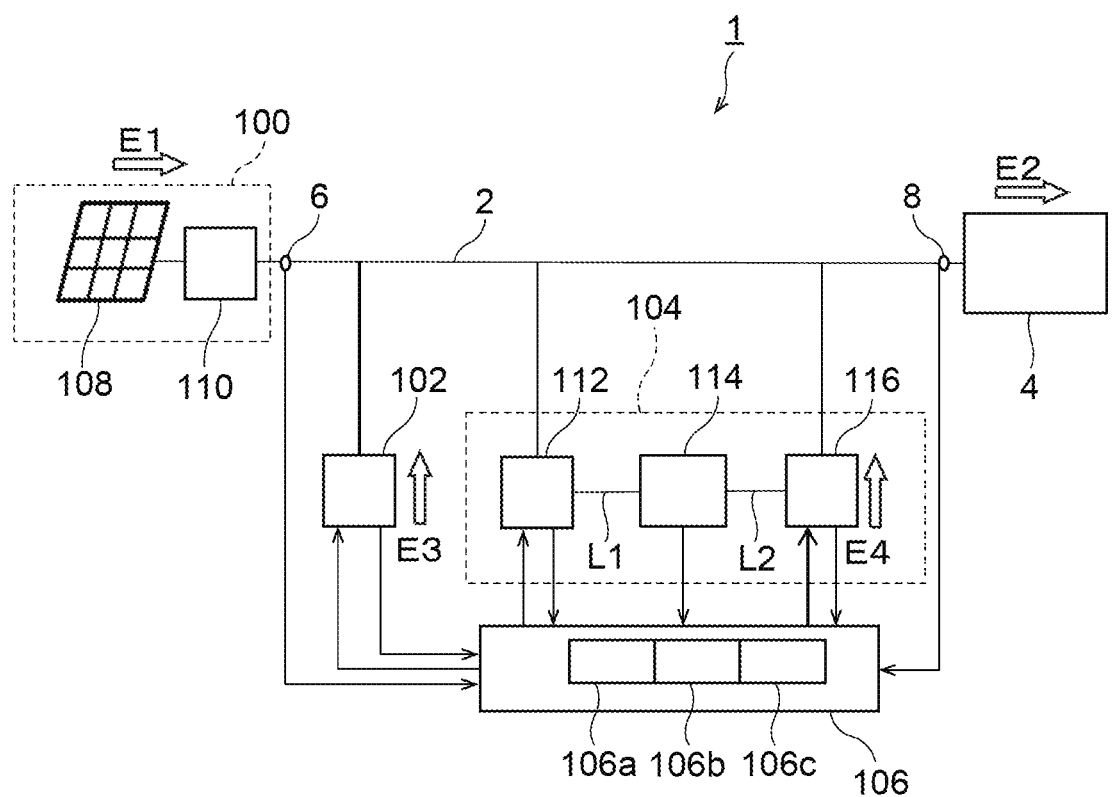
FIG. 1 is a block diagram showing a configuration of a power supply system according to the present embodiment.
FIG. 2 is a diagram explaining control mode examples of a controller.

A control apparatus for a power supply system, a control method for a power supply system, and a power supply system according to an embodiment of the present invention will be described in detail below with reference to the drawings. Note that the embodiment illustrated below is an exemplary embodiment of the present invention, and the present invention should not be interpreted by limiting to the embodiment. Also, in the drawings referred to in the present embodiment, same parts or parts having similar functions are denoted by same or similar reference signs, and redundant description thereof may be omitted. Also, size ratios in the drawings may be different from actual size ratios for convenience of explanation and some components may be omitted from the drawings.

FIG. 1 is a block diagram showing a configuration of a power supply system 1 according to an embodiment. As shown in FIG. 1, the power supply system 1 according to the present embodiment is capable of generating electric power using hydrogen produced by decomposition using renewable energy, and includes a power generator 100, a storage battery 102, a hydrogen power generator 104, and a control apparatus 106. FIG. 1 further shows a first power transmitting unit 2, a load 4, a first measuring device 6, a second measuring device 8, and hydrogen pipes L1 and L2.

The power generator 100 generates electric power using renewable energy, and includes a power generating unit 108 and a generated output regulating unit 110. The power generating unit 108 generates electric power using renewable energy. For example, the power generating unit 108 is made up of a solar power generator that uses sunlight, wind power generator that uses wind power, or the like. The power generating unit 108 does not need fuel such as fossil fuel, but the power output of the power generating unit 108 is affected by environmental factors such as weather and wind power.

The generated output regulating unit 110 controls the power generating unit 108. The generated output regulating unit 110 is connected to the load 4, the storage battery 102, and a hydrogen producing unit 112 of the hydrogen power generator 104 via the power transmitting unit 2. This allows the generated output regulating unit 110 to supply the generated output of the power generating unit 108 to the load 4, storage battery 102, and hydrogen producing unit 112. The power transmitting unit 2 is, for example, a conductor wire, and is made up of an electric conductor such as copper.

The storage battery 102 gets charged and discharged to offset short-term excess and deficiency of the electric power supplied to the load 4 from the power generating unit 108, preferentially over the hydrogen power generator 104. That is, the storage battery 102 is quicker in control response than the hydrogen producing unit 112 during charge, and quicker in control response than a hydrogen power generating unit 116 during discharge. The storage battery 102 is made up, for example, of a secondary battery, large-capacitance capacitor, fly wheel, SMES, or the like and supports electricity charging and discharging higher in speed than on the order of seconds to minutes. That is, when electric power is supplied to the load 4 from at least one of the power generating unit 108 and hydrogen power generating unit 116, the storage battery 102 gets charged and discharged with excess and deficiency of the electricity supplied to the load 4 to make up for response delays of the power generating unit 108 and hydrogen power generating unit 116. Also, when electric power is supplied to the load 4 and hydrogen producing unit 112 from the power generating unit 108, the storage battery 102 gets charged and discharged with excess and deficiency of the electricity supplied to the load 4 and hydrogen producing unit 112 from the power generating unit 108. This makes it possible to level out the electric power supplied to the load 4 from the power generating unit 108. More specifically, the storage battery 102 gets charged and discharged with electricity via the power transmitting unit 2 according to a charge and discharge signal received from the control apparatus 106.

The hydrogen power generator 104 produces hydrogen using electric power supplied from the power generating unit 108 configured to use renewable energy, and supplies electric power generated using the produced hydrogen to the load 4. The hydrogen power generator 104 includes the hydrogen producing unit 112, a hydrogen storage unit 114, and the hydrogen power generating unit 116.

Using the electric power supplied from the power generating unit 108 via the power transmitting unit 2, the hydrogen producing unit 112 produces hydrogen by electrolysis of water and stores the produced hydrogen in the hydrogen storage unit 114. The hydrogen producing unit 112 is, for example, a water electrolysis device adapted to produce hydrogen and oxygen from water by passing an electric current through an alkaline solution. That is, the hydrogen producing unit 112 is communicated with the hydrogen storage unit 114 through the hydrogen pipe L1 and stores produced hydrogen in the hydrogen storage unit 114. This allows the hydrogen producing unit 112 to produce hydrogen using surplus electricity and store the hydrogen. More specifically, the hydrogen producing unit 112 electrolyzes water according to a hydrogen producing signal received from the control apparatus 106 and produces hydrogen and oxygen.

The hydrogen storage unit 114, which is made up, for example, of a hydrogen tank, stores hydrogen transferred from the hydrogen producing unit 112. That is, the hydrogen storage unit 114 is communicated with the hydrogen producing unit 112 and hydrogen power generating unit 116 through the hydrogen pipes L1 and L2. Note that the hydrogen storage unit 114 may be made up of an atmospheric-pressure hydrogen tank, high-pressure hydrogen cylinder, hydrogen storing alloy, or the like.

The hydrogen power generating unit 116, which is, for example, a fuel cell, supplies electric power generated using the hydrogen stored in the hydrogen storage unit 114 to the load 4. That is, the hydrogen power generating unit 116 generates electric power using oxygen as well as hydrogen and oxygen supplied through the hydrogen pipe L2. Regarding the oxygen, the hydrogen power generating unit 116 may use either atmospheric oxygen or oxygen outputted by the hydrogen producing unit 112 as a result of hydrogen production and stored in an oxygen tank. This makes it possible to make up for a power shortage using electric power generated by the hydrogen power generating unit 116. More specifically, the hydrogen power generating unit 116 generates electric power according to a power generation signal received from the control apparatus 106.

The control apparatus 106, which is, for example, an energy management system controller, is connected to the storage battery 102, generated output regulating unit 110, hydrogen producing unit 112, hydrogen storage unit 114, hydrogen power generating unit 116, first measuring device 6, and second measuring device 8, and controls the storage battery 102, hydrogen producing unit 112, hydrogen power generating unit 116, and the like.

The first measuring device 6, which is made up, for example, of a wattmeter, outputs electric power information about the generated output of the power generating unit 108 to the control apparatus 106. The second measuring device 8, which is made up, for example, of a wattmeter, outputs electric power information about power consumption of the load 4 to the control apparatus 106. Differential values between the first measuring device 6 and second measuring device 8 in measured electric power indicate excess and deficient electric power values of electric power supplied to the load 4 from the power generating unit 108.

A more specific configuration of the control apparatus 106 will be described. The control apparatus 106 includes an acquiring unit 106a, a controller 106b, and a memory 106c.

The acquiring unit 106a acquires information about remaining energy in the storage battery 102. More specifically, the acquiring unit 106a acquires information about control operations, such as information about current, voltage, charge/discharged energy, power-generating capacity, power consumption, hydrogen production volume, hydrogen consumption, and accumulated hydrogen volume from the storage battery 102, generated output regulating unit 110, hydrogen producing unit 112, hydrogen storage unit 114, hydrogen power generating unit 116, first measuring device 6, and second measuring device 8. Also, the acquiring unit 106a acquires data about weather such as weather data, weather forecast data via an external network. In this way, the acquiring unit 106a acquires information about time-series remaining energy in the storage battery 102. In this case, the acquiring unit 106a may acquire remaining energy values of storage battery 102 directly from the storage battery 102.

The controller 106b according to the present embodiment performs control in such a way as to preferentially use electric power of the storage battery 102 higher in energy conversion efficiency than the hydrogen power generator 104 and thereby improve energy conversion efficiency of the entire power supply system 1. That is, the controller 106b according to the present embodiment controls the hydrogen power generating unit 116 so as to generate electric power to make up for deficiencies mainly using the electric power of the storage battery 102 for example, when electric power delivered from the power generating unit 108 to the load 4 is insufficient, and supplement the electric power of the storage battery 102 if the electric power is still insufficient.

On the other hand, when the remaining energy in the storage battery 102 reaches a first threshold, e.g., a discharge limit value, the storage battery 102 becomes unable to get charged and discharged to offset short-term excess and deficiency of the electric power delivered from the storage battery 102 to the load 4. This might cause the entire power supply system 1 to stop.

Therefore, when it is expected that the remaining energy in the storage battery 102 will reach the first threshold, e.g., the discharge limit value, within a predetermined time, the controller 106b controls the hydrogen power generating unit 116 of the hydrogen power generator 100 so as to start generating electric power. Also, when a decrease rate of the remaining energy in the storage battery 102 reaches a predetermined value, the controller 106b controls the hydrogen power generating unit 116 of the hydrogen power generator 100 so as to start generating electric power. This prevents the remaining energy in the storage battery 102 from reaching the discharge limit value. Alternatively, it becomes possible to extend the time until the remaining energy in the storage battery 102 reaches the discharge limit value. Here, the term "processor" means a circuit such as CPU (Central Processing Unit) or GPU (Graphics Processing Unit). A detailed configuration of the controller 106b will be described later.

The memory 106c is implemented, for example, by a semiconductor memory element such as a RAM (Random Access Memory) or flash memory, a hard disk, or optical disc. The memory 106c stores a program for use to operate the controller 106b. Also, the memory 106c stores information acquired by the acquiring unit 106a.

FIG. 2 is a diagram explaining control mode examples of the controller 106b. Reference sign E1 denotes power output of the power generating unit 108, E2 denotes an amount of power consumption of the load 4, E3 denotes charged/discharged energy of the storage battery 102, and E4 denotes generated output of the hydrogen power generating unit 116. Regarding the charged/discharged energy of the storage battery 102, the discharging is indicated by a plus sign (+) and the charging is indicated by a minus sign (−). The controller 106b controls charging and discharging of the storage battery 102 and power generation of the hydrogen power generating unit 116 using, for example, modes I to VII.

In mode I, the storage battery 102 is discharged and the hydrogen power generating unit 116 is stopped. In mode II, the storage battery 102 is charged and the hydrogen power generating unit 116 is caused to generate electric power. In mode III, the storage battery 102 is discharged and the hydrogen power generating unit 116 is caused to generate electric power. In mode IV, the storage battery 102 is discharged and the hydrogen power generating unit 116 is stopped, and an amount of discharge of the storage battery 102 is larger than in mode I. In mode V, the storage battery 102 is charged and the hydrogen power generating unit 116 is stopped. In mode VI, the storage battery 102 is charged and the hydrogen power generating unit 116 is caused to generate electric power, and power output of the hydrogen power generating unit 116 is larger than in mode II. In mode VII, the storage battery 102 is discharged and the hydrogen power generating unit 116 is caused to generate electric power, and the amount of discharge of the storage battery 102 is larger than in mode III and power output of the hydrogen power generating unit 116 is larger than in mode III.

Figure 3:
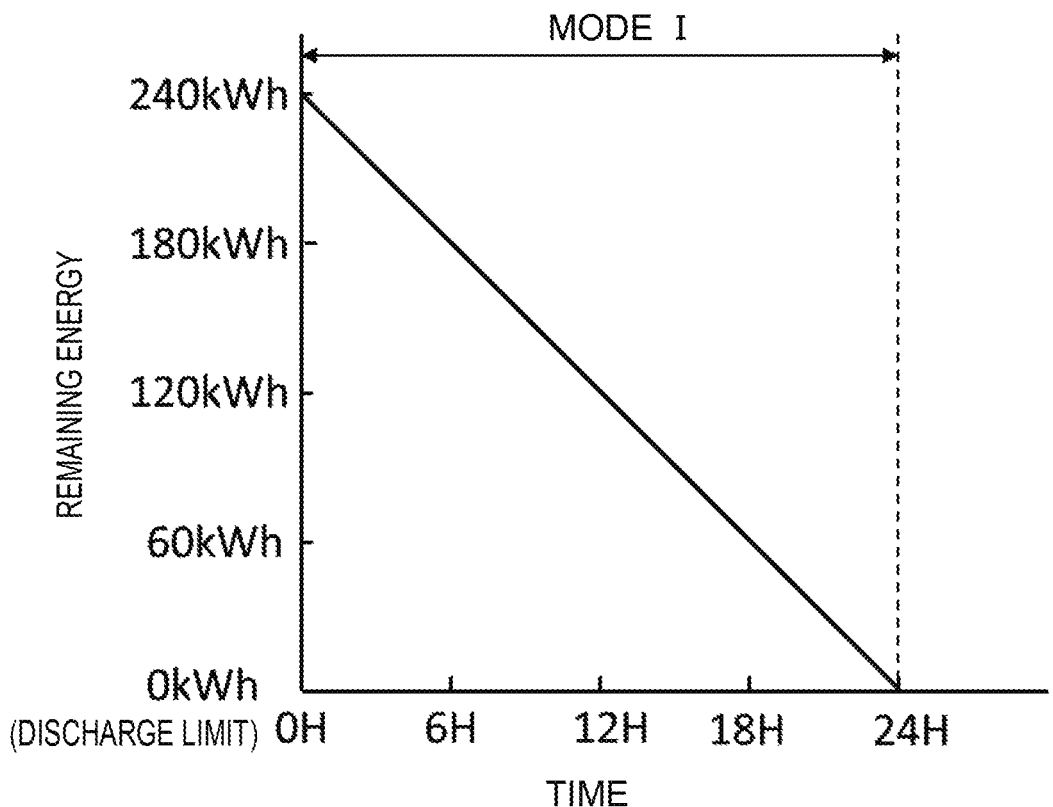
FIG. 3 is a diagram showing an example of remaining energy in a storage battery in mode I.

FIG. 3 is a diagram showing an example of remaining energy in the storage battery 102 in mode I, where the ordinate represents the remaining energy in the storage battery 102 and the abscissa represents time. Here, the power output E1 of the power generating unit 108 is 0 and the amount of power consumption E4 of the load 4 is 10 kW. Also, the remaining energy in the storage battery 102 at full charge is 240 kWh and the discharge limit is 0 kWh. Starting from full charge, if a period of mode I, in which 10 kWh is consumed, continues, the remaining energy is reduced to 0 kWh in 24 hours, reaching the discharge limit, and the storage battery 102 can no longer be discharged.

Figure 4:
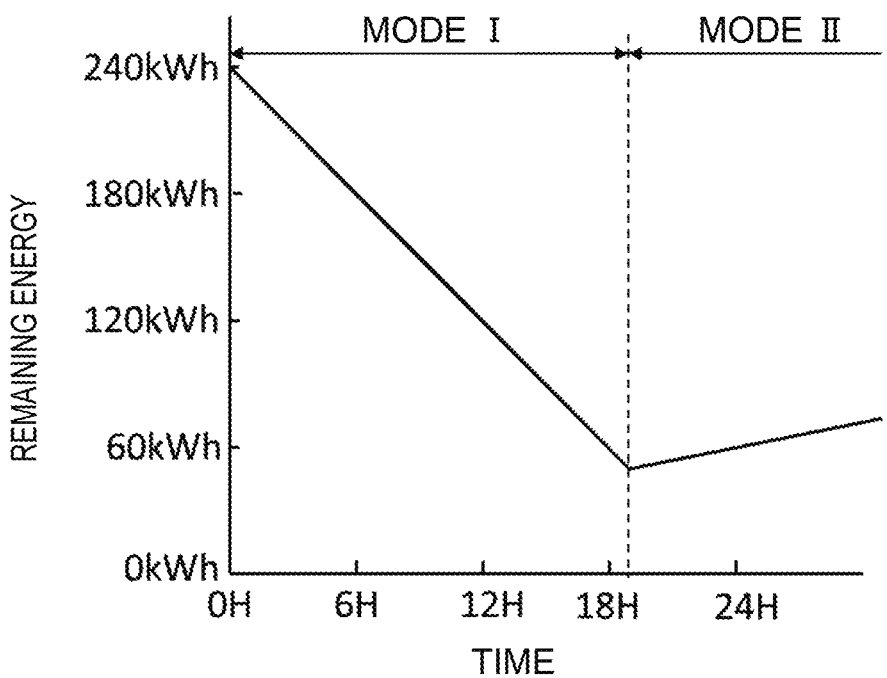
FIG. 4 is a diagram showing an example of remaining energy in the storage battery in modes I and II.

FIG. 4 is a diagram showing an example of remaining energy in the storage battery 102 in modes I and II, where the ordinate represents the remaining energy in the storage battery 102 and the abscissa represents time. Here, the power output E1 of the power generating unit 108 is 0 and the amount of power consumption E4 of the load 4 is 10 kWh. Also, the remaining energy in the storage battery 102 at full charge is 240 kWh and the discharge limit is 0 kWh.

When the period of mode I continues, the remaining energy in the storage battery 102 decreases gradually. When it is expected that the remaining energy in the storage battery 102 will reach the discharge limit, the controller 106b performs control, thereby switching the control mode to mode II. By increasing the power output of the hydrogen power generating unit 116 to 12 kWh, it is possible to charge the storage battery 102 with 2 kW. Consequently, the controller 106b can restore the remaining energy in the storage battery 102.

Figure 5:
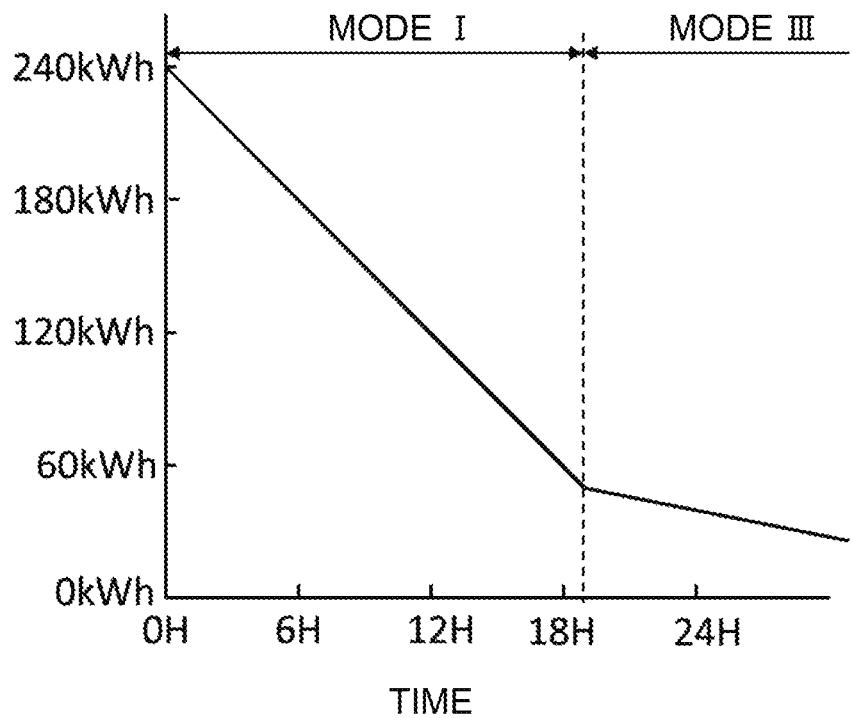
FIG. 5 is a diagram showing an example of remaining energy in the storage battery in modes I and III.

FIG. 5 is a diagram showing an example of remaining energy in the storage battery 102 in modes I and III, where the ordinate represents the remaining energy in the storage battery 102 and the abscissa represents time. Here, the power output E1 of the power generating unit 108 is 0 and the amount of power consumption E4 of the load 4 is 10 kWh. Also, the remaining energy in the storage battery 102 at full charge is 240 kWh and the discharge limit is 0 kWh.

When the period of mode I continues, the remaining energy in the storage battery 102 decreases gradually. When it is expected that the remaining energy in the storage battery 102 will reach the discharge limit, the controller 106b switches the control mode to mode III. Consequently, the power output of the hydrogen power generating unit 116 becomes 8 kW, allowing the amount of discharge of the storage battery 102 to be reduced from 10 kW to 2 kW. This makes it possible to reduce decreases of the remaining energy in the storage battery 102.

Figure 6:
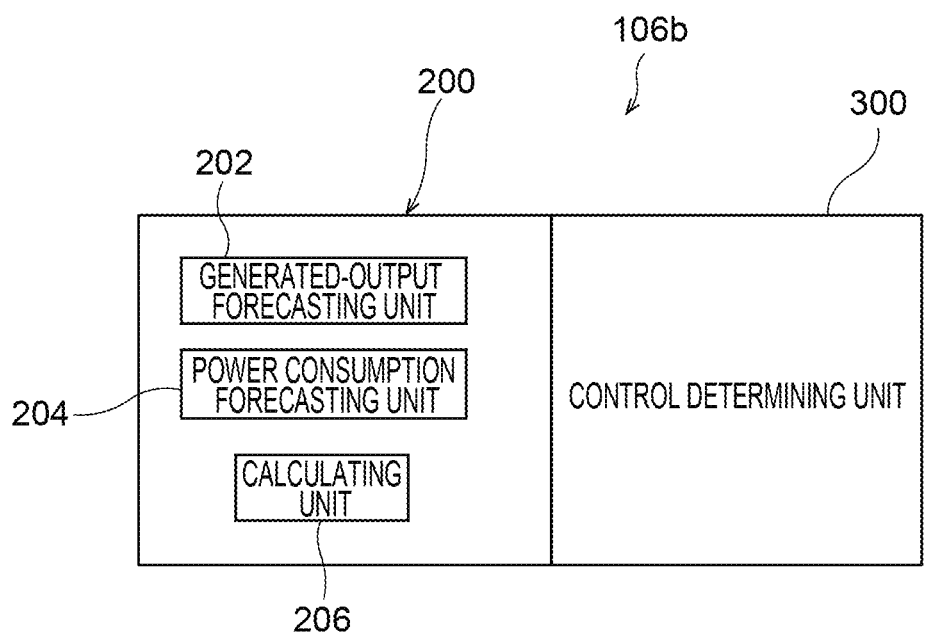
FIG. 6 is a block diagram showing a configuration of the controller.

Based on FIG. 6, a more detailed configuration of the controller 106b will be described. FIG. 6 is a block diagram showing a configuration of the controller 106b. The controller 106b includes a forecasting unit 200 and control determining unit 300.

The forecasting unit 200 forecasts time-series remaining energy in the storage battery 102. That is, the forecasting unit 200 forecasts time-series remaining energy in the storage battery 102 using time-series forecast values of generated output of the power generator 100 and time-series forecast values of power consumption of the load 4. More specifically, the forecasting unit 200 includes a generated-output forecasting unit 202, an amount-of-power-consumption forecasting unit 204, and a calculating unit 206.

When the time-series remaining energy forecasted by the forecasting unit 200 reaches the first threshold, i.e., a value that represents the discharge limit, within a predetermined time, the control determining unit 300 controls the hydrogen power generator 104 so as to start generating electric power. Here, the predetermined time depends on forecast accuracy of the forecasting unit 200, and is, for example, 6 hours.

Figure 7:
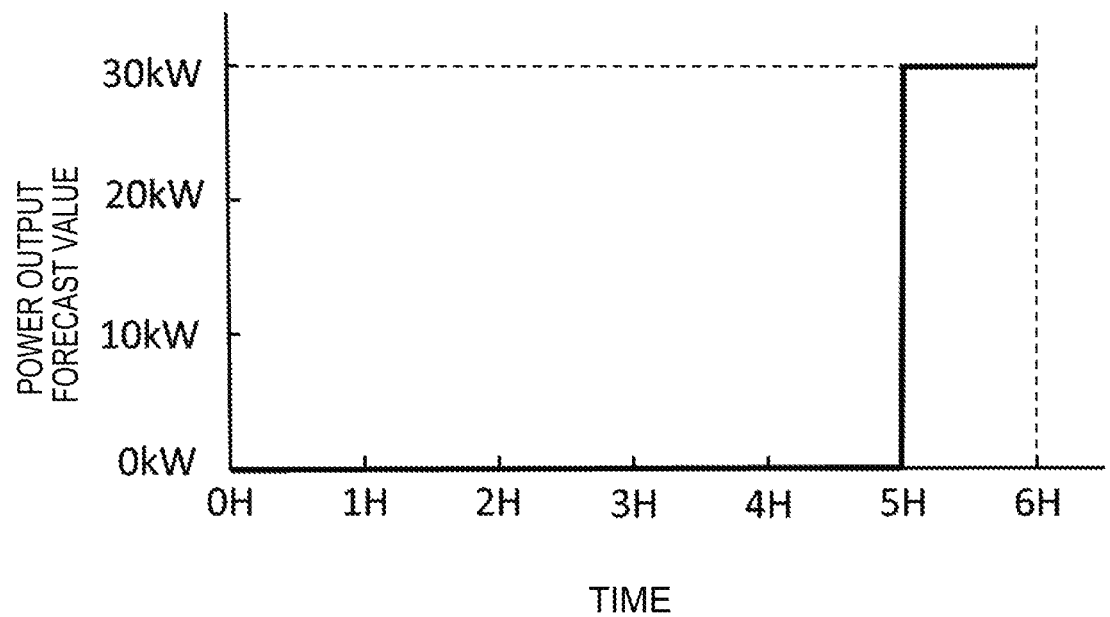
FIG. 7 is a diagram showing forecast values of time-series generated output, where the forecast values are found by a generated-output forecasting unit.

FIG. 7 is a diagram showing forecast values of time-series generated output, the forecast values being found by the generated-output forecasting unit 202, where the ordinate represents generated output and the abscissa represents time. Here, the forecasting time is 6 hours.

As shown in FIG. 7, the generated-output forecasting unit 202 forecasts the time-series generated output of the hydrogen power generator 104. The generated-output forecasting unit 202 forecasts the time-series generated output of the hydrogen power generator 104 by sequentially substituting weather forecast data for a forecast period acquired by the acquiring unit 106a into a function that represents a relationship between past weather data and past generated output of the hydrogen power generator 104. The weather forecast data concerns fine weather or rain, temperature, wind speed, and the like during the forecast period.

Note that the function that represents a relationship between past weather data and past generated output of the hydrogen power generator 104 is learned through a so-called neural network using the weather data as input and the generated output of the hydrogen power generator 104 as output. Note that forecasting methods available for use by the generated-output forecasting unit 202 are not limited to this, and a typical forecasting method may be used.

Figure 8:
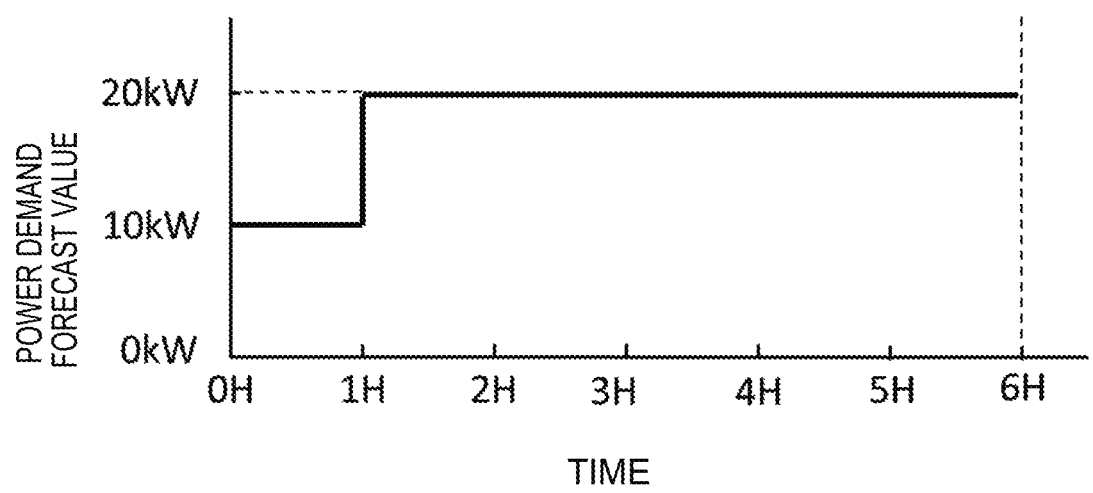
FIG. 8 is a diagram showing forecast values of time-series power consumption, where the forecast values are found by a power consumption forecasting unit.

FIG. 8 is a diagram showing forecast values of time-series power consumption, the forecast values being found by a power consumption forecasting unit 204, where the ordinate represents the power demand forecast value, i.e., power consumption forecast value of the load 4, and the abscissa represents time. Here, the forecasting time is 6 hours.

As shown in FIG. 8, the power consumption forecasting unit 204 forecasts time-series power consumption of the load 4. The power consumption forecasting unit 204 forecasts the time-series power consumption of the load 4 by sequentially substituting weather forecast data for a forecast period acquired by the acquiring unit 106a into a function that represents a relationship between past weather data and past power consumption of the load 4. The weather forecast data concerns fine weather or rain, temperature, wind speed, and the like during the forecast period.

Note that the function that represents a relationship between past weather data and past power consumption of the load 4 is learned through a so-called neural network using the weather data as input and the power consumption of the load 4 as output. Note that forecasting methods available for use by the power consumption forecasting unit 204 are not limited to this, and a typical forecasting method may be used.

Using the forecast values of time-series generated output found by the generated-output forecasting unit 202 and the forecast values of time-series power consumption found by the power consumption forecasting unit 204, the calculating unit 206 calculates forecast values of time-series remaining energy in the storage battery 102. More specifically, the calculating unit 206 obtains forecast values of time-series remaining energy in the storage battery 102, by accumulating differences obtained by subtracting the forecast values of time-series power consumption found by the power consumption forecasting unit 204 from the forecast values of time-series generated output found by the generated-output forecasting unit 202.

When the hydrogen power generator 104 generates electricity at constant power or generates electricity in a specific pattern, the calculating unit 206 may use electric power values that make predetermined time-series changes according to the season or the date and time, as the time-series forecast values of the generated output of the hydrogen power generator 104. Consequently, when the hydrogen power generator 104 generates electricity at constant power or generates electricity in a specific pattern, forecast values of time-series remaining energy in the storage battery 102 can be obtained at higher accuracy.

Similarly, when the load 4 consumes electricity at constant power or consumes electricity in a specific pattern, the calculating unit 206 may use electric power values that make predetermined time-series changes according to the season or the date and time, as the time-series forecast values of the power consumption of the load 4. Consequently, when the load 4 consumes electricity at constant power or consumes electricity in a specific pattern, forecast values of time-series remaining energy in the storage battery 102 can be obtained at higher accuracy.

Figure 9:
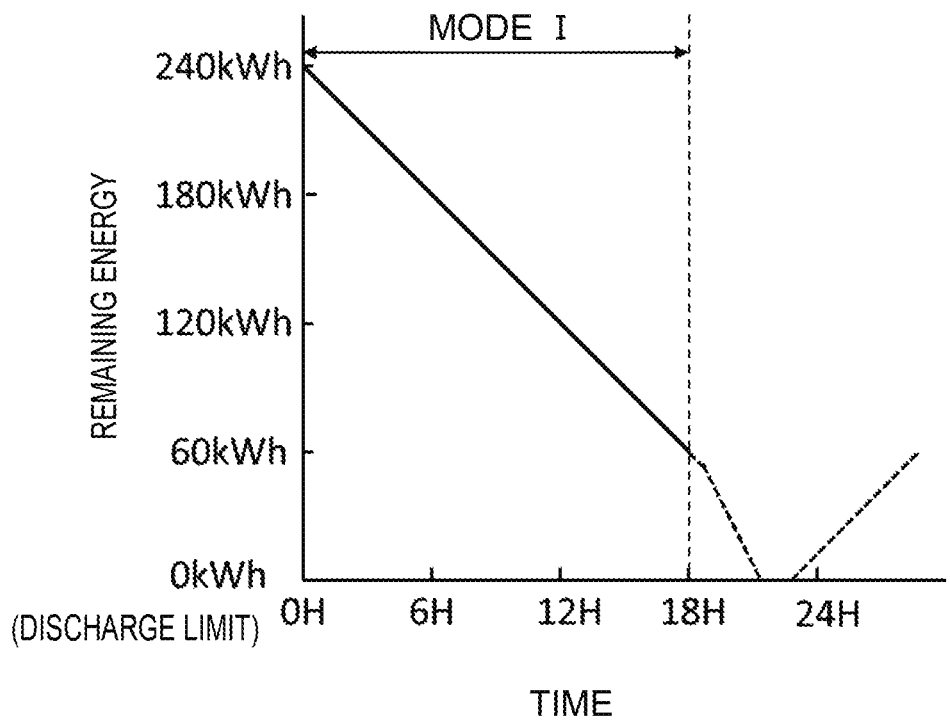
FIG. 9 is a diagram showing an example of remaining energy in the storage battery.

FIG. 9 is a diagram showing an example of remaining energy in the storage battery 102, where the ordinate represents the remaining energy in the storage battery 102 and the abscissa represents time. In the period of mode I, actual measured values of the remaining energy in the storage battery 102 are shown. The dotted lines indicate forecast results up to 6 hours ahead produced by the forecasting unit 200 at 18 o'clock. That is, the dotted lines indicate forecast values of time-series remaining energy in the storage battery 102 calculated by the calculating unit 206 using the forecast values of time-series generated output found by the generated-output forecasting unit 202 shown in FIG. 6 and the forecast values of time-series power consumption found by the power consumption forecasting unit 204 shown in FIG. 7.

As shown in FIG. 9, between 18 o'clock and 19 o'clock, the storage battery 102 discharges 10 kWh. After 19 o'clock, the discharge from the storage battery 102 increases to 20 kWh. Consequently, the remaining energy in the storage battery 102 is expected to be 50 kWh at 19 o'clock. At 21:30 two and a half hours later, the remaining energy in the storage battery 102 is expected to reach the discharge limit of 0 kWh, which is the first threshold. Consequently, it is expected that after 21:30, the storage battery 102 can no longer discharge and that the load 4 can no longer be supplied with stable power.

Figure 10:
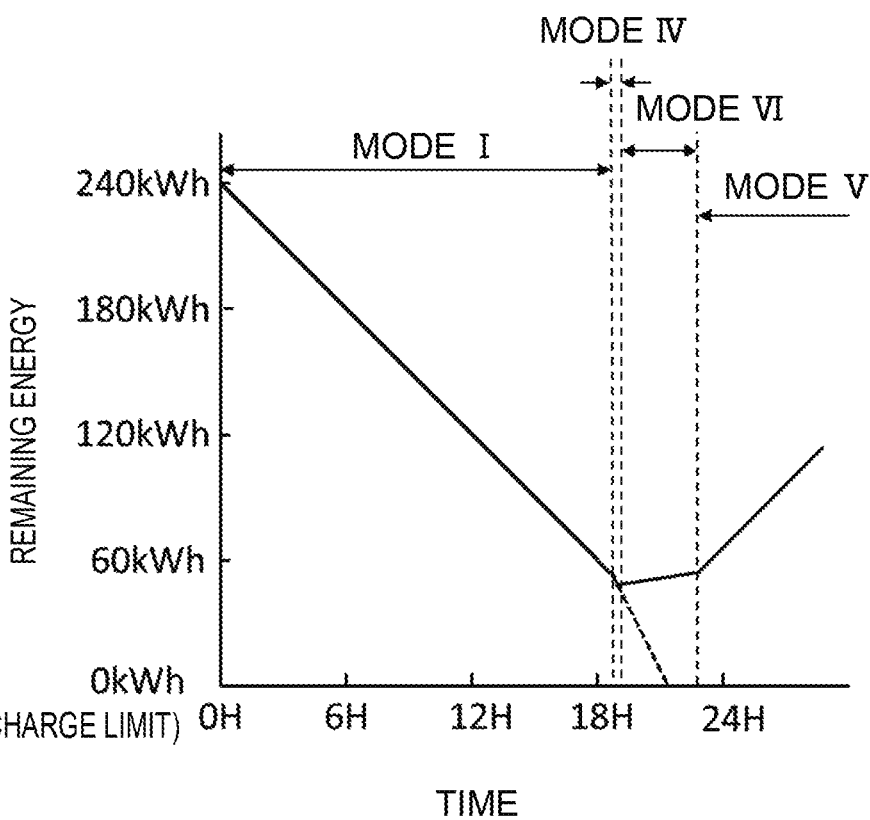
FIG. 10 is a diagram showing remaining energy when a hydrogen power generator is caused to start generating electric power.

FIG. 10 is a diagram showing an example of remaining energy in the storage battery 102 when a hydrogen power generator 104 is caused to start generating electric power, where the ordinate represents the remaining energy in the storage battery 102 and the abscissa represents time. It is assumed that the remaining energy in the storage battery 102 at full charge is 240 kWh and that the discharge limit is 0 kWh.

Since it is expected that the time-series remaining energy forecasted by the forecasting unit 200 will reach the first threshold, i.e., a value that represents the discharge limit at 21:30 as described above, the control determining unit 300 controls the hydrogen power generator 104 so as to start generating electric power. That is, starting from 19 o'clock at which the forecast that the remaining energy will reach the first threshold is made, the control determining unit 300 performs control operations in modes VI and V in sequence. As a result of control in mode VI, the hydrogen power generator 104 starts generating electric power of 22 kWh at 19 o'clock. Consequently, the storage battery 102 is charged at 2 kWh. Next, when the power generator 100 generates electric power at 30 kWh at 23 o'clock, the control determining unit 300 performs a control operation in mode V. That is, the control determining unit 300 stops power generation of the hydrogen power generator 104 and charges the storage battery 102 with 10 kWh. In this way, based on the time-series remaining energy forecasted by the forecasting unit 200, it becomes possible to forecast that the time-series remaining energy in the storage battery 102 will reach the discharge limit and thereby prevent the remaining energy in the storage battery 102 from reaching the discharge limit. Alternatively, it becomes possible to extend the time until the remaining energy in the storage battery 102 reaches the discharge limit without increasing capacity of the storage battery 102. Also, when the time until depletion of the remaining energy in the storage battery 102 is extended, it becomes possible to increase the chances that stored energy in the storage battery 102 will be restored by generated output of the power generator 100 and thereby further reduce equipment capacity of the storage battery 102.

Figure 11:
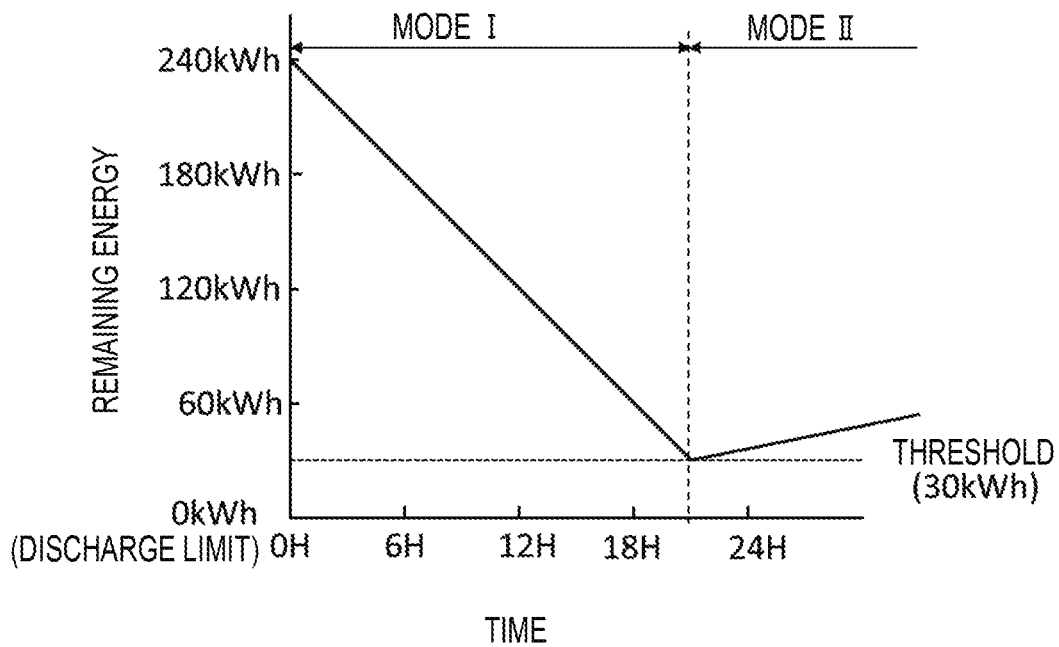
FIG. 11 is a diagram showing an example of controlling the remaining energy in the storage battery using a second threshold.

FIG. 11 is a diagram showing an example of controlling the remaining energy in the storage battery 102 using a second threshold, where the ordinate represents the remaining energy in the storage battery 102 and the abscissa represents time. It is assumed that the remaining energy in the storage battery 102 at full charge is 240 kWh, that the discharge limit is 0 kWh, and that the second threshold is 30 kWh.

The control determining unit 300 starts discharging the storage battery 102 in control mode I. After 19 hours from the start of discharge, the remaining energy in the storage battery 102 reaches 30 kWh, which is the second threshold. When the remaining energy in the storage battery 102 reaches the second threshold, the control determining unit 300 makes the hydrogen power generator 104 start generating electric power. That is, when the remaining energy in the storage battery 102 reaches the second threshold, the control determining unit 300 makes the hydrogen power generator 104 start generating electric power, for example, in control mode II regardless of the forecast results produced by the forecasting unit 200. This makes it possible to maintain the remaining energy in the storage battery 102 even if there is variation in the forecast accuracy of the forecasting unit 200.

Figure 12:
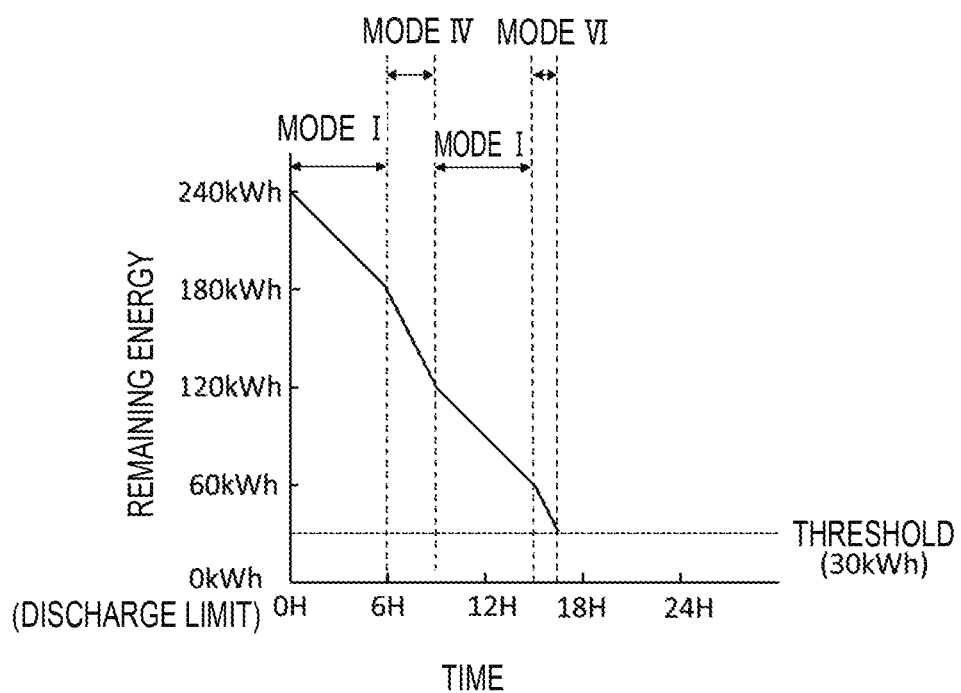
FIG. 12 is a diagram showing time-series variation of the remaining energy in the storage battery in modes I and IV.

FIG. 12 is a diagram showing time-series variation of the remaining energy in the storage battery 102 in modes I and IV, where the ordinate represents the remaining energy in the storage battery 102 and the abscissa represents time. It is assumed that the remaining energy in the storage battery 102 at full charge is 240 kWh, that the discharge limit is 0 kWh, and that the second threshold is 30 kWh. The control determining unit 300 starts discharging the storage battery 102 in control mode I. In 6 hours from the start of discharge, the remaining energy in the storage battery 102 becomes 180 kWh. Subsequently, the power consumption of the load 4 increases to 20 kW and the control determining unit 300 discharges the storage battery 102 in mode IV. After 3 hours from the discharge in mode IV, the remaining energy in the storage battery 102 becomes 120 kWh. The control determining unit 300 returns to control in mode I and continues control. After the return to control in mode I, when 6 hours elapses further, the remaining energy in the storage battery 102 becomes 60 kWh. The power consumption of the load 4 increases to 20 kW, and the control determining unit 300 discharges the storage battery 102 in mode IV again. In this way, through discharging for a total of 16 and a half hours, the remaining energy in the storage battery 102 reaches a discharge threshold of 30 kWh.

Figure 13:
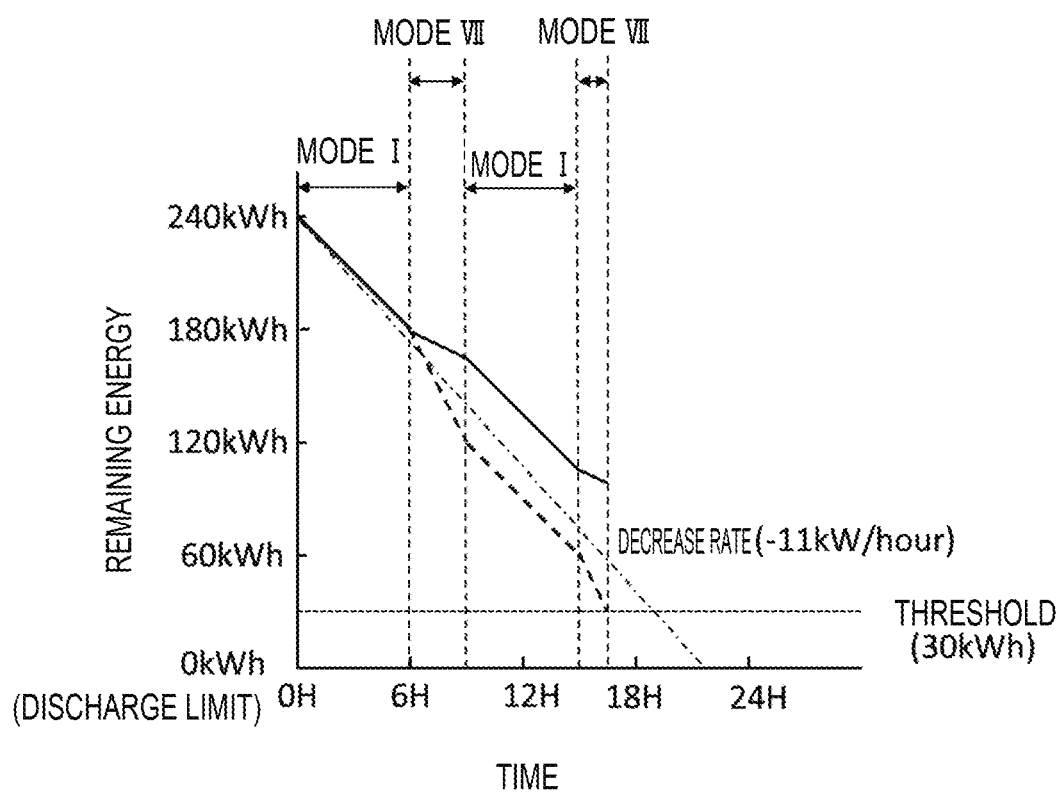
FIG. 13 is a diagram showing an example of controlling the remaining energy in the storage battery using a decrease rate of the remaining energy.

FIG. 13 is a diagram showing an example of controlling the remaining energy in the storage battery 102 using a decrease rate of the remaining energy, where the ordinate represents the remaining energy in the storage battery 102 and the abscissa represents time. It is assumed that the remaining energy in the storage battery 102 at full charge is 240 kWh, that the discharge limit is 0 kWh, and that decrease rate is, for example, −11 kW/h. The dotted line represents time-series variation of the remaining energy in the storage battery 102 shown in FIG. 12, the alternate long and short dash line represents a straight line that has an intercept equal to the remaining energy of 240 kWh at full charge and a slope equal to the decrease rate of −11 kW/h, and the solid line represents the remaining energy in the storage battery 102 that results when electric power is generated by the hydrogen power generator 104.

The control determining unit 300 starts discharging the storage battery 102 in control mode I. After 6 hours from the start of discharge, the decrease rate of the remaining energy in the storage battery 102 reaches −11 kW/h, which is a predetermined value. When the decrease rate of the remaining energy in the storage battery 102 reaches the predetermined value of −11 kW/h, the control determining unit 300 causes the storage battery 102 to discharge and the hydrogen power generator 104 to generate electric power in operation mode VII. The predetermined value of −11 kW/h is found experimentally from past data, and when the decrease rate is exceeded, the remaining energy in the storage battery 102 tends to reach a discharge limit.

Thus, instead of mode IV (FIG. 12), the control determining unit 300 continues control in mode VII for 3 hours. Consequently, whereas initially the remaining energy in the storage battery 102 at the end of control in mode IV (FIG. 12) is 120 kWh, the remaining energy in the storage battery 102 is improved to 165 kWh. Note that whereas in the present embodiment, description has been given of a case in which a threshold is set for the reduction rate of the remaining energy, similar effects can be obtained if a threshold is set for an increase rate of the discharged energy of the storage battery 102.

Figure 14:
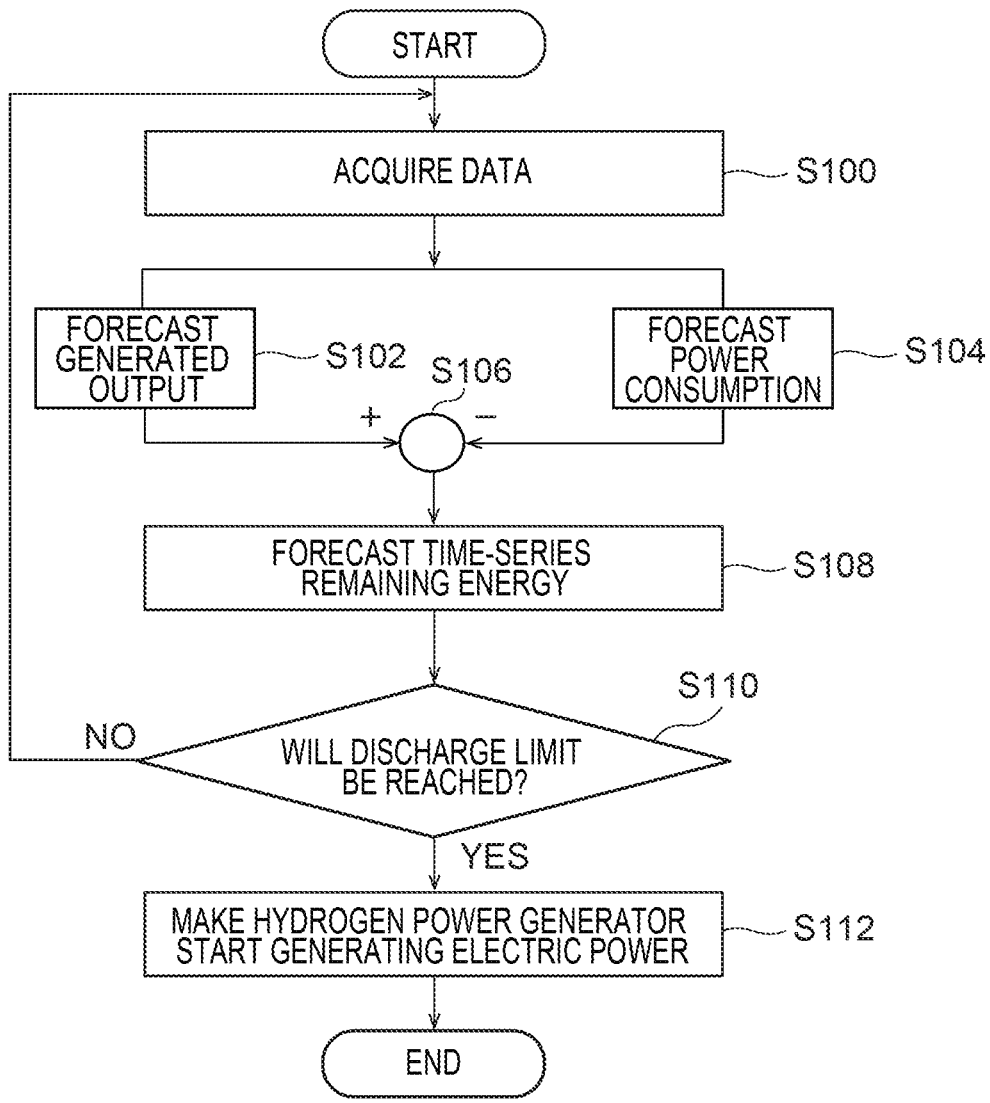
FIG. 14 is a flowchart, which is an exemplary control flow of the power supply system.

FIG. 14 is a flowchart, which is an exemplary control flow of the power supply system 1, and the exemplary control flow of the power supply system 1 will be described based on FIG. 14. Here, an example of control up to when the controller 106b makes the hydrogen power generator 104 start generating electric power will be described.

The acquiring unit 106a acquires remaining energy values of the power storage device 102 and weather forecast data and stores the values and data in the memory 106c (step S100). The remaining energy values of the power storage device 102 are acquired from the power storage device 102. On the other hand, the weather forecast data is acquired from an outside source such as a specialized site.

Using the weather forecast data, the generated-output forecasting unit 202 forecasts time-series generated output of the power generator 100 for a predetermined period (step S102). Also, the amount-of-power-consumption forecasting unit 204 forecasts time-series generated output of the load 4 for a predetermined period using the weather forecast data (step S104).

Next, the calculating unit 206 calculates forecast values of time-series remaining energy in the storage battery 102 using the forecast values of time-series generated output found by the generated-output forecasting unit 202 and the forecast values of time-series power consumption found by the power consumption forecasting unit 204 (step S106).

The control determining unit 300 of the control apparatus 106 determines whether the forecast value of the time-series remaining energy in the storage battery 102 reaches the first threshold (step S108).

If the forecast value does not reach the first threshold (NO in step S108), the control determining unit 300 repeats the process beginning with S100. On the other hand, if the forecast value does not reach the first threshold (YES in step S108), the control determining unit 300 controls the hydrogen power generator 104 so as to start generating electric power (step S112).

In this way, using the forecast values of the time-series remaining energy in the storage battery 102 calculated by the calculating unit 206 of the forecasting unit 200, the control determining unit 300 forecasts whether the remaining energy in the storage battery 102 will reach the first threshold.

Thus, according to the present embodiment, based on the time-series remaining energy forecasted by the forecasting unit 200, it becomes possible to forecast that the time-series remaining energy in the storage battery 102 will reach the discharge limit. In this way, when it is expected that the time-series remaining energy in the storage battery 102 will reach the discharge limit within a predetermined time, the hydrogen power generator 104 is caused to generate electric power, curbing increases in the utilization rate of the hydrogen power generator 104. On the other hand, since the hydrogen power generator 104 is caused to generate electric power according to forecasted conditions of the generated output of the power generator 100 and forecasted conditions of the power consumption of the load 4 before the time-series remaining energy in the storage battery 102 reaches the discharge limit, it becomes possible to extend the time until the remaining energy in the storage battery 102 reaches the discharge limit.

Although some embodiments of the present invention have been described above, these embodiments are presented only by way of example, and not intended to limit the scope of the invention. These novel embodiments can be implemented in various other forms, and various omissions, replacements, and changes can be made without departing from the spirit of the invention. Such embodiments and modifications thereof are included in the spirit and scope of the invention as well as in the invention set forth in the appended claims and the scope of equivalents thereof.

The invention claimed is:

1. A control apparatus for a power supply system that includes a hydrogen power generator adapted to generate hydrogen using electric power supplied from a power generator that uses renewable energy and supply a load with electric power generated using the generated hydrogen, and a storage battery adapted to get charged and discharged to offset excess and deficiency of the electric power supplied to the load from the power generator, preferentially over the hydrogen power generator, the control apparatus comprising:
   an acquiring unit adapted to acquire information about remaining energy in the storage battery; and
   a controller adapted to control the hydrogen power generator so as to start generating electric power when it is expected, based on the information, that the remaining energy in the storage battery reaches a first threshold within a predetermined time.

2. The control apparatus for a power supply system according to claim 1, wherein:
   the controller includes a forecasting unit adapted to forecast time-series remaining energy in the storage battery; and
   when the forecasted time-series remaining energy reaches the first threshold within the predetermined time, the controller controls the hydrogen power generator so as to start generating electric power.

3. The control apparatus for a power supply system according to claim 2, wherein the forecasting unit forecasts the time-series remaining energy in the storage battery using time-series forecast values of generated output of the hydrogen power generator and time-series forecast values of power consumption of the load, the generated output and the power consumption being forecasted based on data about weather.

4. The control apparatus for a power supply system according to claim 3, wherein as the time-series forecast values of generated output of the hydrogen power generator, the forecasting unit uses electric power values that make predetermined time-series changes according to season.

5. The control apparatus for a power supply system according to claim 3, wherein as the time-series forecast values of power consumption of the load, the forecasting unit uses electric power values that make predetermined time-series changes according to season.

6. The control apparatus for a power supply system according to claim 1, wherein:
   the first threshold is a discharge limit value of the storage battery; and
   when the remaining energy in the storage battery reaches a second threshold larger than the first threshold, the controller controls the hydrogen power generator so as to start generating electric power.

7. The control apparatus for a power supply system according to claim 1, wherein the controller controls the hydrogen power generator so as to start generating electric power when a decrease rate of the remaining energy in the storage battery reaches a predetermined value.

8. A control method for a power supply system that includes a hydrogen power generator adapted to generate hydrogen using electric power supplied from a power generator that uses renewable energy and supply a load with electric power generated using the generated hydrogen, and a storage battery adapted to get charged and discharged to offset excess and deficiency of the electric power supplied to the load from the hydrogen power generator, preferentially over the hydrogen power generator, the control method comprising:
   acquiring information about time-series remaining energy in the storage battery; and
   controlling the hydrogen power generator so as to start generating electric power when it is expected, based on the information, that the remaining energy in the storage battery reaches a first threshold within a predetermined time or when a decrease rate of the remaining energy in the storage battery reaches a predetermined value.

9. A power supply system comprising:
   a hydrogen power generator adapted to generate hydrogen using electric power supplied from a power generator that uses renewable energy and supply a load with electric power generated using the generated hydrogen;
   a storage battery configured to be quicker in control response than the hydrogen power generator and adapted to get charged and discharged to offset excess and deficiency of the electric power supplied to the load from the power generator; and a control apparatus adapted to control the hydrogen power generator and the storage battery, wherein the control apparatus includes:
an acquiring unit adapted to acquire information about remaining amount in the storage battery; and
a controller adapted to control the hydrogen power generator so as to start generating electric power when it is expected, based on the information, based on the information, that the remaining energy in the storage battery reaches a first threshold within a predetermined time or when a decrease rate of the remaining energy in the storage battery reaches a predetermined value.

10. A control apparatus for a power supply system that includes a hydrogen power generator adapted to generate hydrogen using electric power supplied from a power generator that uses renewable energy and supply a load with electric power generated using the generated hydrogen, and a storage battery adapted to get charged and discharged to offset excess and deficiency of the electric power supplied to the load from the power generator, preferentially over the hydrogen power generator, the control apparatus comprising:
an acquiring unit adapted to acquire information about remaining energy in the storage battery; and
a controller adapted to control the hydrogen power generator so as to start generating electric power when a decrease rate of the remaining energy in the storage battery reaches a predetermined value.

\* \* \* \* \*